(12) United States Patent
Knop et al.

(10) Patent No.: US 7,677,221 B2
(45) Date of Patent: Mar. 16, 2010

(54) INTERNAL-COMBUSTION ENGINE, NOTABLY OF DIRECT INJECTION TYPE, WITH A PISTON PROVIDED WITH A BOWL COMPRISING A TEAT

(75) Inventors: Vincent Knop, Rueil Malmaison (FR); Alain Ranini, Rueil Malmaison (FR); Bruno Walter, Colombes (FR)

(73) Assignee: Institut Francais du Petrole (FR)

( * ) Notice: Subject to any disclaimer, the term of this patent is extended or adjusted under 35 U.S.C. 154(b) by 112 days.

(21) Appl. No.: 11/908,842

(22) PCT Filed: Mar. 15, 2006

(86) PCT No.: PCT/FR2006/000593
§ 371 (c)(1),
(2), (4) Date: Apr. 25, 2008

(87) PCT Pub. No.: WO2006/097639
PCT Pub. Date: Sep. 21, 2006

(65) Prior Publication Data
US 2009/0114185 A1 May 7, 2009

(30) Foreign Application Priority Data
Mar. 17, 2005 (FR) .................................. 05 02648

(51) Int. Cl.
*F02B 3/00* (2006.01)
*F02B 5/00* (2006.01)
(52) U.S. Cl. ..................... 123/294; 123/305; 123/276
(58) Field of Classification Search ............... 123/294, 123/298, 301, 305, 276, 279
See application file for complete search history.

(56) References Cited

U.S. PATENT DOCUMENTS

| 5,740,775 | A | 4/1998 | Suzuki et al. |
| 6,202,601 | B1 | 3/2001 | Ouellette et al. |
| 6,640,772 | B2 * | 11/2003 | Gatellier et al. ............. 123/298 |
| 6,675,767 | B2 * | 1/2004 | Gatellier et al. ............. 123/298 |
| 6,691,670 | B1 * | 2/2004 | Gatellier et al. ............. 123/298 |
| 6,827,059 | B2 * | 12/2004 | Gatellier et al. ............. 123/276 |

(Continued)

FOREIGN PATENT DOCUMENTS

DE  100 28 449 A1  7/2001

(Continued)

*Primary Examiner*—John T Kwon
(74) *Attorney, Agent, or Firm*—Antonelli, Terry, Stout & Kraus, LLP.

(57) ABSTRACT

The invention concerns an internal combustion engine, in particular with direct injection comprising at least one cylinder (10), one piston (30) sliding in said cylinder, a combustion chamber (26) delimited on one side by the upper side of the piston including a concave trough (32) wherein is arranged a dog point (34) with apex angle (a2) and a fuel injector (22) for injecting fuel at a spray angle ($a_1$) not greater than 2 Arctg CD/2f where CD is the diameter of the cylinder (10) and F the distance between the point of origin of the fuel jets derived from the injector and the position of the piston (30) corresponding to a crankshaft angle of 50° relative to the upper dead center. The invention is characterized in that the apex angle ($a_2$) of the dog point is greater than the spray angle ($a_1$) by an angle ranging between 30° and 60°.

1 Claim, 2 Drawing Sheets

U.S. PATENT DOCUMENTS

| | | |
|---|---|---|
| 6,877,464 B2 | 4/2005 | Hitomi et al. |
| 7,284,506 B1 | 10/2007 | Sun et al. |
| 2003/0168037 A1 | 9/2003 | zur Loye et al. |
| 2004/0118116 A1 | 6/2004 | Beck et al. |
| 2004/0129245 A1 | 7/2004 | Hitomi et al. |
| 2004/0149255 A1 | 8/2004 | zur Loye et al. |
| 2005/0211218 A1 | 9/2005 | Liu et al. |
| 2005/0224606 A1 | 10/2005 | Dingle |
| 2005/0288846 A1 | 12/2005 | Liu et al. |
| 2006/0196467 A1 | 9/2006 | Kang et al. |
| 2007/0163535 A1* | 7/2007 | Walter ........................ 123/276 |

FOREIGN PATENT DOCUMENTS

| | | |
|---|---|---|
| EP | 0887525 A2 | 12/1998 |
| EP | 0943793 A2 | 9/1999 |
| EP | 1 357 274 B1 | 10/2003 |
| EP | 1445461 A2 | 8/2004 |
| FR | 2 818 324 | 6/2002 |
| FR | 2 818 325 | 6/2002 |
| WO | WO 2005/001255 A1 | 1/2005 |
| WO | WO 2005/033493 A1 | 4/2005 |

* cited by examiner

INTERNAL-COMBUSTION ENGINE, NOTABLY OF DIRECT INJECTION TYPE, WITH A PISTON PROVIDED WITH A BOWL COMPRISING A TEAT

FIELD OF THE INVENTION

The present invention relates to an internal-combustion engine, notably of direct injection type, with a piston provided with a bowl comprising a teat.

It more particularly relates to a diesel type direct-injection engine that can run according to two combustion modes. A homogeneous mode, for low and medium engine loads, with a fuel injection allowing to obtain homogeneous mixing of the fuel with air or with a mixture of air and of recirculated exhaust gas, before combustion starts. The other combustion mode, referred to as conventional combustion, consists of a fuel injection in the vicinity of the piston top dead centre and of a diffusion combustion, this mode being preferably used at high loads.

BACKGROUND OF THE INVENTION

Such an engine type, as better described in French patent applications No. 2,818,324 and 2,818,325 filed by the applicant, comprises at least a cylinder, a piston sliding in this cylinder, a combustion chamber delimited on one side by the upper face of the piston comprising a teat arranged in the centre of a concave bowl and at least one injection nozzle for injecting fuel with a nappe angle less than or equal to $$2 Arctg \frac{CD}{2F},$$

where CD is the diameter of the cylinder and F the distance between the point of origin of the fuel jets from the injection nozzle and the position of the piston corresponding to a crank angle of 50° to the top dead centre.

Thus, in case of early injection, i.e. when the position of the piston is in the vicinity of 50° crank angle for the injection phase selected in relation to the piston top dead centre, the fuel does not come into contact with the cylinder wall and it mixes with the air or the mixture of air and of recirculated exhaust gas present in the combustion chamber.

In this type of engine, the applicant has used a bowl with particular values for the vertex angle of the teat (0° to 30° greater than those of the nappe angle) that allow to obtain homogeneous mixing of the fuel mixture upon injection.

The applicant has continued its research on this vertex angle and has obtained results according to which this vertex angle can be increased even further while improving the engine performances, as regards power as well as emissions such as soot emissions.

SUMMARY OF THE INVENTION

The present invention therefore relates to an internal-combustion engine, notably of direct injection type, comprising at least a cylinder, a piston sliding in this cylinder, a combustion chamber delimited on one side by the upper face of said piston comprising a concave bowl within which a teat of vertex angle $a_2$ is arranged and a fuel injection nozzle for injecting fuel with a jet nappe angle $a_1$ less than or equal to $$2 Arctg \frac{CD}{2F},$$

where CD is the diameter of the cylinder and F the distance between the point of origin of the fuel jets from the injection nozzle and the position of the piston corresponding to a crank angle of 50° to the top dead centre (TDC), characterized in that vertex angle $a_2$ of the teat is greater than jet nappe angle $a_1$ by an angle greater than 30° and less than 60°.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
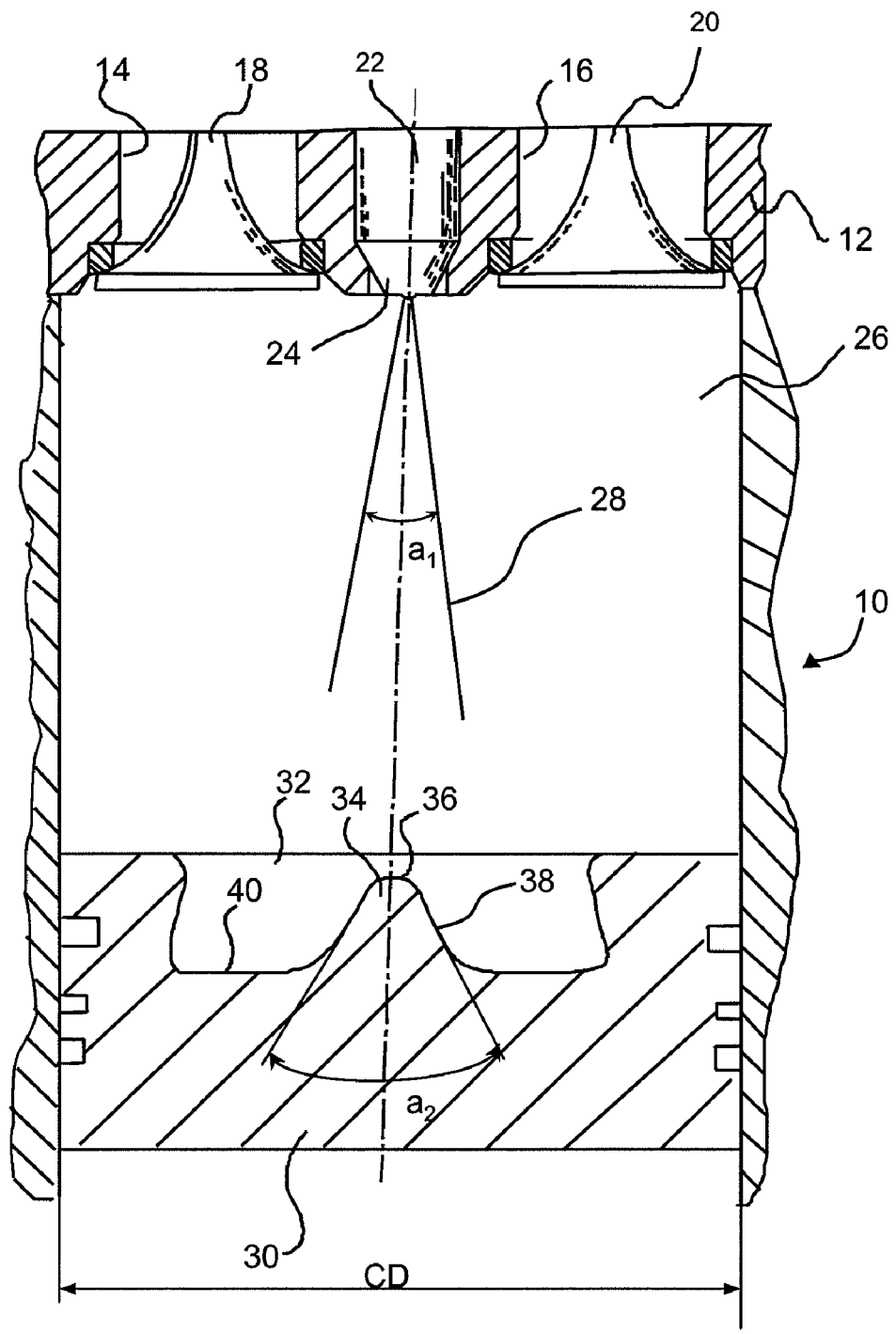
FIG. 1 diagrammatically shows an internal-combustion engine according to the invention.

In connection with FIG. 1, a direct-injection internal-combustion engine, notably of diesel type, comprises at least a cylinder 10 of diameter CD and a cylinder head 12 carrying air intake means and burnt gas exhaust means, here respectively at least one intake pipe 14 for a gaseous fluid, such as air or a mixture of air and of recirculated exhaust gas (EGR), at least one burnt gas exhaust pipe 16, opening or closing of the pipes being controlled by an intake valve 18 and an exhaust valve 20. The cylinder head also carries a fuel injection nozzle 22 that is preferably coaxial to the axis of the cylinder and comprises, in the vicinity of its nose 24, a multiplicity of orifices through which the fuel is sprayed into combustion chamber 26 in form of jets 28. The combustion chamber is delimited by the upper face of piston 30, sliding in a rectilinear reciprocating manner in cylinder 10, the inner face of cylinder head 12 opposite this piston and the circular wall of cylinder 10 contained between the two faces. The upper face of the piston comprises a concave bowl 32 within which a teat 34 located substantially in the centre of the bowl rises towards cylinder head 12.

As better described in French patents No. 2,818,324 and 2,818,325 filed by the applicant, fuel injection nozzle 22 is of small jet nappe angle $a_1$ type. This angle $a_1$ is so selected that the wall of cylinder 10 is never wetted by the fuel for any position of piston 30 between +50° and +α or between −50° and −α, where α represents the crank angle for the injection phase selected in relation to the piston top dead centre, this angle being greater than 50° and less than or equal to 180° so as to obtain a homogeneous type combustion.

If CD represents the diameter (in mm) of cylinder 10 and F the distance (in mm) between the point of origin of fuel jets 28 and the position of the piston corresponding to a crank angle of 50°, then nappe angle $a_1$ (in degrees) is less than or equal to $$2 Arctg \frac{CD}{2F}.$$

What is referred to as nappe angle is the vertex angle formed by the cone from the nozzle and whose fictitious peripheral wall passes through all the axes of fuel jets 28.

Advantageously, the angular range for nappe angle $a_1$ is at most 120° and preferably between 40° and 100°.

As mentioned above, piston 30 comprises a bowl 32 whose concavity is turned towards the cylinder head and that is provided with teat 34.

The teat, which is located in the centre of bowl 32 and can be coaxial to the axis of fuel jet nappe $a_1$, has a conical shape with a slightly rounded vertex 36. This vertex is continued by an inclined flank 38 substantially rectilinear in the direction of bottom 40 of the bowl. Vertex angle $a_2$ of the teat is suited to nappe angle $a_1$ in such a way that the fuel is injected substantially along flank 38 of this teat. Preferably, this vertex angle $a_2$ of the teat is greater by an angle of 30° than nappe angle $a_1$ and smaller by an angle of 60° than this nappe angle.

Figure 2:
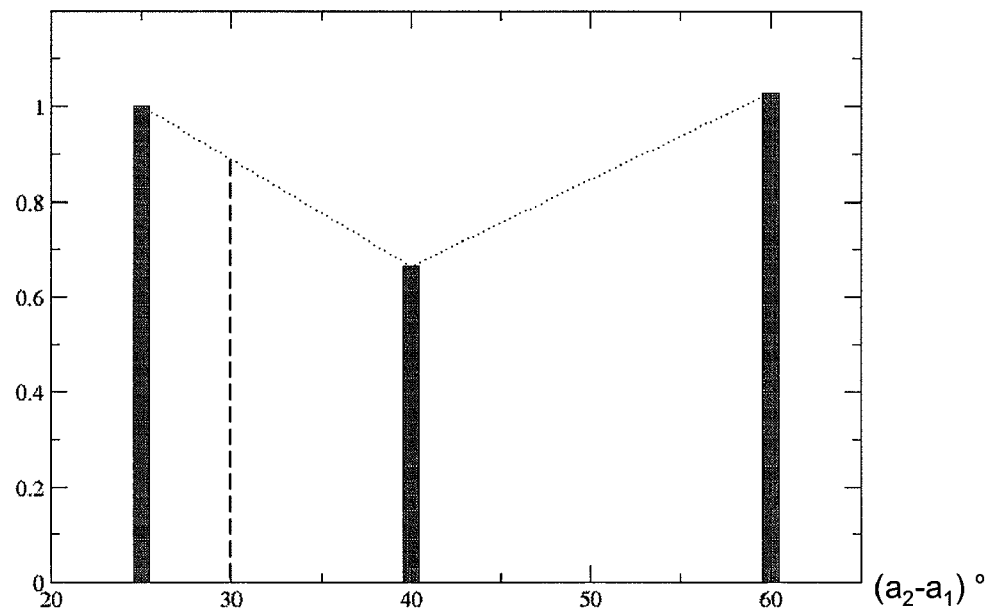
FIG. 2 is a graph showing the evolution of the amount of soot (S) according to the difference between the vertex angle of the teat and the fuel jet nappe angle $(a_2-a_1)°$, in degrees.
Figure 3:
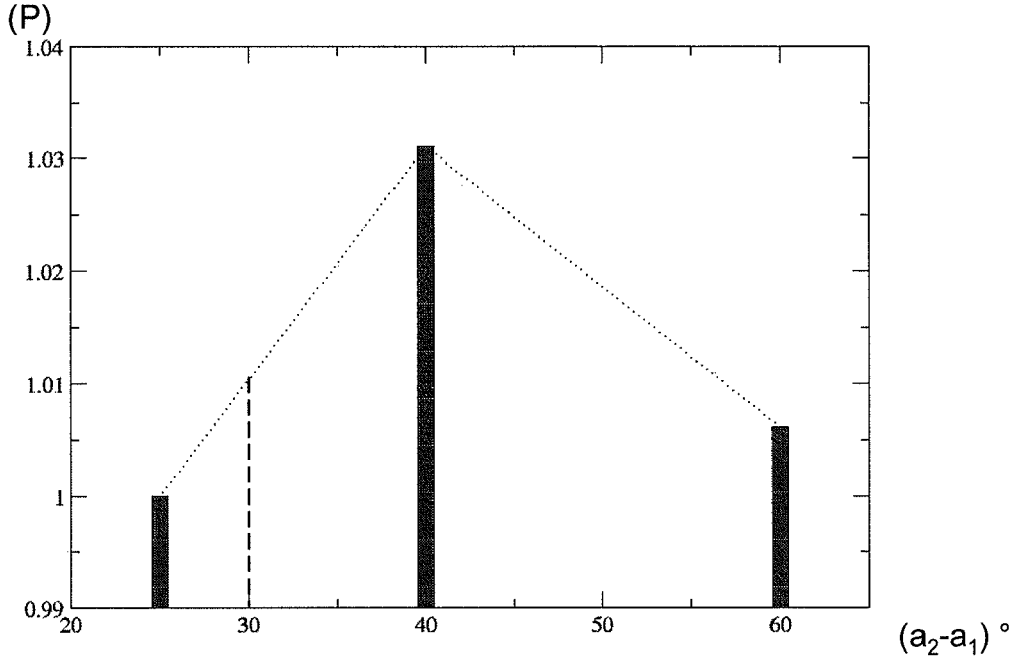
FIG. 3 is also a graph showing the evolution of the power levels generated by the engine (P) according to the difference between the vertex angle of the teat and the fuel jet nappe angle $(a_2-a_1)°$, in degrees.

FIGS. 2 and 3 illustrate, only by way of examples, the pollutant emission variations, notably soot, and the engine power (P) variations according to the difference between vertex angle $a_2$ of the teat and nappe angle $a_1$ of the fuel jets. In these figures, the applicant shows the results of its research work on an engine with a piston whose teat has a vertex angle whose difference with fuel jet nappe angle $a_1$ ranges from 25° to 60°.

It can be noted that, in FIG. 2, the amount of soot significantly decreases with an angle difference $a_2$-$a_1$ ranging between 25° and 30°, which is the range described in French patent applications No. 2,818,324 and 2,818,325. Surprisingly enough, this amount of soot decreases yet more significantly between an angle difference $a_2$-$a_1$ greater than 30° and less than or equal to 40°, then increases between an angle difference $a_2$-$a_1$ greater than 40° and less than or equal to 60°, until an angle difference level of 25° is reached. One can therefore consider that the vertex angle of the teat is greater than jet nappe angle $a_1$ by an angle greater than 30° and less than 60° while limiting emissions.

This can also be seen in FIG. 3, where the engine power (P) increases between an angle difference $a_2$-$a_1$ ranging between 25° and 30°, then continues to increase (by the order of 2% in relation to the power considered at the angle difference of 30°) between an angle difference ranging between 30° and 40°, and eventually decreases until it reaches the angle difference of 60° while remaining higher than the power considered at the angle difference of 25°.

The present invention is not limited to the embodiments described above by way of examples and it encompasses any variant and equivalent.

The invention claimed is:

1. An internal-combustion engine, notably of direct injection type, comprising at least a cylinder, a piston sliding in this cylinder, a combustion chamber delimited on one side by the upper face of said piston comprising a concave bowl within which a teat of vertex angle ($a_2$) is arranged and a fuel injection nozzle for injecting fuel with a jet nappe angle ($a_1$) less than or equal to $$2 Arctg \frac{CD}{2F},$$

where CD is the diameter of cylinder and F the distance between the point of origin of the fuel jets from the injection nozzle and the position of piston corresponding to a crank angle of 50° to the top dead centre (TDC), characterized in that vertex angle ($a_2$) of teat is greater than jet nappe angle ($a_1$) by an angle greater than 30° and less than 60°.

* * * * *